(12) United States Patent
Hansen et al.

(10) Patent No.: US 8,302,401 B2
(45) Date of Patent: *Nov. 6, 2012

(54) METHOD FOR POWERING AN APPARATUS

(75) Inventors: Craig N. Hansen, Plymouth, MN (US); Paul C. Cross, Shorewood, MN (US)

(73) Assignee: Hansen Engine Corporation, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/200,502

(22) Filed: Sep. 26, 2011

(65) Prior Publication Data

US 2012/0041664 A1 Feb. 16, 2012

Related U.S. Application Data

(63) Continuation of application No. 12/800,870, filed on May 25, 2010, which is a continuation of application No. 11/391,700, filed on Mar. 28, 2006, now Pat. No. 7,726,285.

(60) Provisional application No. 60/666,891, filed on Apr. 1, 2005.

(51) Int. Cl.
*F02B 33/44* (2006.01)
*F02B 33/00* (2006.01)
*B60K 6/46* (2007.10)

(52) U.S. Cl. .................. 60/608; 180/65.245; 123/559.1; 123/564

(58) Field of Classification Search ....... 123/559.1–564; 60/608, 624; 417/213, 295, 307, 279, 364; 701/51; 180/65.245

See application file for complete search history.

(56) References Cited

U.S. PATENT DOCUMENTS

| | | | | |
|---|---|---|---|---|
| 2,519,913 | A | 8/1950 | Lysholm | 418/201.2 |
| 3,088,658 | A | 5/1963 | Wagenius | 418/201.2 |
| 3,151,806 | A | 10/1964 | Whitfield | 418/201.2 |
| 3,303,348 | A | 2/1967 | Cox et al. | 60/602 |
| 3,673,796 | A | 7/1972 | Weick et al. | 123/564 |
| 3,933,137 | A | 1/1976 | Uno et al. | 123/564 |
| 4,452,043 | A * | 6/1984 | Wallace | 60/624 |
| 4,453,900 | A | 6/1984 | Schibbye et al. | 418/201.2 |
| 4,597,726 | A | 7/1986 | Söderlund et al. | 418/201.2 |
| 4,802,457 | A | 2/1989 | Oscarsson | 123/559.1 |
| 5,108,269 | A | 4/1992 | Glanvall | 418/201.2 |
| 5,203,683 | A | 4/1993 | Yoshikawa et al. | 418/201.2 |
| 5,207,206 | A | 5/1993 | Takahashi et al. | 418/201.2 |
| 5,347,972 | A | 9/1994 | Sandou et al. | 123/564 |
| 5,791,315 | A | 8/1998 | Riach et al. | 418/201.2 |
| 5,979,168 | A | 11/1999 | Beekman | 418/201.2 |
| 6,022,203 | A | 2/2000 | Kirsten | 418/201.2 |
| 6,401,012 | B1 | 6/2002 | Aoki et al. | 701/54 |
| 6,478,100 | B1 * | 11/2002 | Grewe | 180/65.245 |
| 6,695,591 | B2 | 2/2004 | Grimmer et al. | 417/203 |

(Continued)

FOREIGN PATENT DOCUMENTS

WO    WO 0026527 A1 *  5/2000

*Primary Examiner* — Thai Ba Trieu

(74) *Attorney, Agent, or Firm* — Richard John Bartz

(57) ABSTRACT

An internal combustion engine is coupled to a supercharger operable to supply varying amounts of air to the engine responsive to the load on the engine. The supercharger has a pair of screw rotors driven by the engine to move air to the engine and a control apparatus for varying the mass and pressure of air supplied to the engine.

10 Claims, 14 Drawing Sheets

U.S. PATENT DOCUMENTS

| | | | |
|---|---|---|---|
| 6,901,324 B2 | 5/2005 | Rose et al. ........................ 701/54 |
| 6,931,850 B2 | 8/2005 | Frank et al. ..................... 60/608 |
| 7,076,954 B1 | 7/2006 | Sopko et al. .................... 60/608 |
| 7,137,253 B2 | 11/2006 | Furman et al. ................. 60/608 |
| 7,174,714 B2 | 2/2007 | Algrain ........................... 60/608 |
| 7,726,285 B1 * | 6/2010 | Hansen et al. .............. 123/559.1 |
| 2002/0116925 A1 | 8/2002 | Hampson et al. ............. 60/605.1 |
| 2009/0044532 A1 | 2/2009 | Wu et al. ......................... 60/608 |

* cited by examiner

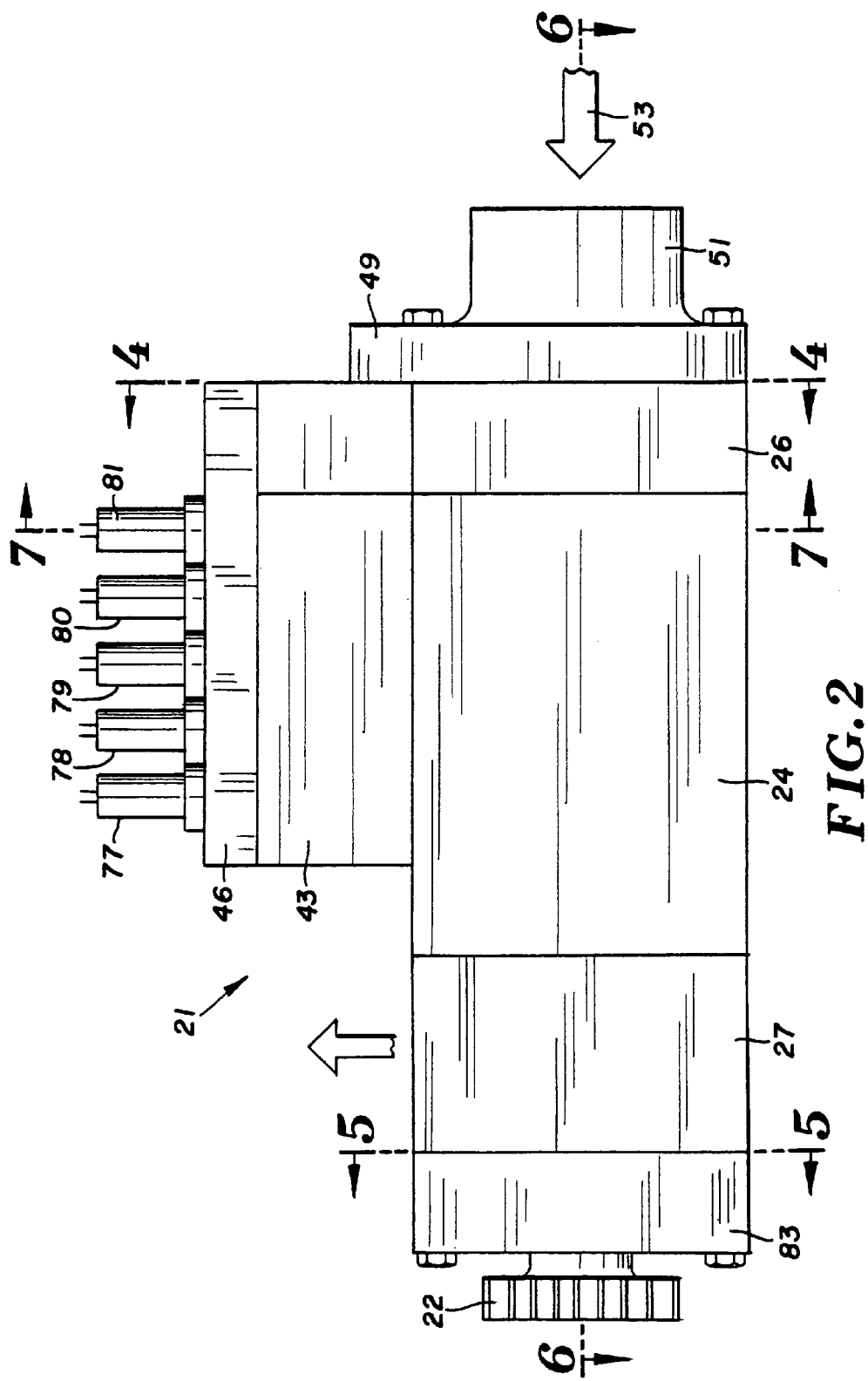

METHOD FOR POWERING AN APPARATUS

CROSS REFERENCE TO RELATED APPLICATION

This application is a continuation of U.S. patent application Ser. No. 12/800,870 filed May 25, 2010. Application Ser. No. 12/800,870 is a continuation of U.S. patent application Ser. No. 11/391,700 filed Mar. 28, 2006, now U.S. Pat. No. 7,726,285. Application Ser. No. 11/391,700 claims the benefit of the priority of U.S. Patent Application Ser. No. 60/666,891 filed Apr. 1, 2005.

FIELD OF THE INVENTION

The technology of the invention relates to internal combustion engines equipped with superchargers for supplying air to the engines according to the speed and load of the engines to increase the performance of the engines.

BACKGROUND OF THE INVENTION

Air displacement devices have been developed and used to increase the supply of air and fuel to internal combustion engines to boost engine horsepower. An example of an air displacement device is the "Roots blower" shown by P. H. Roots in U.S. Pat. No. 30,157 and G. Scheerer in U.S. Pat. No. 2,201,014. This device has a belt-driven shaft that drives two close-clearance rotors. The rotating rotors during each rotation sweep out a specific volume of air to an air receiver, such as an internal combustion engine. The rotational speed of the rotors largely determines the unthrottled volume of air discharged by the device. C. N. Hansen and P. C. Cross in U.S. Pat. No. 6,241,498 disclose a supercharger having cooperating rotors drivably connected to an internal combustion engine for delivering an air/fuel mixture to the combustion chamber of the engine. The rotors have semi-cylindrical pockets and protrusions that continuously move air through the supercharger. The unthrottled volume of air discharged by the supercharger depends on the operating speed of the engine that drives the supercharger. The unthrottled volume of air discharged by the supercharger operating at a constant speed varies little. There are no air flow controls to regulate air flowing into and out of the supercharger.

J. E. Whitfield in U.S. Pat. No. 3,151,806 discloses a screw type compressor having a pair of screw rotors rotatably mounted on a housing. Volume control valves are located on the fluid inlet side of a fixed valve spacer. Compression control valves located on the fluid outlet side of the fixed valve spacer regulate the size and length of the fluid discharge outlet. Screws connected to the valves are used to adjust the positions of the valves to provide desired variations in fluid delivery volume and internal compression ratio.

F. Soderlund and K. Karlsson in U.S. Pat. No. 4,597,726 disclose a screw compressor having two rotors rotatably mounted on a housing for mutual meshing engagement. The pressure ratio and the capacity of the compressor is regulated with two slides mounted for independent axial movements. One slide regulates the capacity of the compressor. The other slide regulates the built-in volume ratio of the compressor.

N. Tsuboi in U.S. Pat. No. 4,951,638 discloses a screw type supercharger having a pair of female and male screw rotors. Gears mounted on one end of each rotor synchronize rotation of the rotors so that they do not contact each other. One rotor is connected to an internal combustion engine which provides input power to the supercharger. The supercharger does not include intake air flow controls that regulate the volume of air discharged to an internal combustion engine intake manifold.

J. Oscarsson in U.S. Pat. No. 4,802,457 discloses an internal combustion engine equipped with a supercharger having screw rotors located in a compression chamber. An air capacity regulating device associated with the air inlet side of the supercharger is operated by the foot accelerator when the engine is only partially loaded.

A. B. Riach in U.S. Pat. No. 5,791,315 discloses a spark ignition internal combustion engine coupled to a supercharger having an air inlet port control for controlling the intake air into the supercharger. The control includes an inlet port valve which is open at full engine load and progressively closes when the engine load is progressively reduced and an air flow throttle valve which is open at full engine load and progressively closes when the load is progressively reduced.

G. Kirsten in U.S. Pat. No. 6,022,203 discloses a variable displacement screw-type compressor having a pair of rotors operable to move fluid under compression from an inlet channel to an outlet channel. Housing segments associated with the rotors control the internal compression ratio of the compressor. Control cams rotated with a stepper motor displace the housing segments against the bias of springs.

Four stroke diesel engines do not require blowers or superchargers to supply compressed air for starting and continuous operation. In a four stroke diesel engine the first down stroke of the piston draws air into the cylinder. The air in the cylinder is compressed on the upstroke to about 1,000 pounds per square inch. Near the top of the stroke of the piston a jet of fuel oil begins to spray into the cylinder and is auto-ignited by the hot compressed air in the cylinder. The rapid pressure rise of the fuel oil created by the rapid burning of the gas moves the piston down in the working stroke. The subsequent upstroke drives the exhaust gases and particulates out of the cylinder through an exhaust valve to an exhaust manifold. The output torque of a four stroke diesel engine is controlled by varying the amount of fuel oil injected and burned in the cylinder. The volume of air in a naturally aspirated diesel engine cylinder during each air intake stroke varies little with the speed or torques of the engine but does limit the maximum quantity of fuel that can be injected per cycle.

SUMMARY OF THE INVENTION

The invention constitutes a four stroke diesel engine operably connected to a load, such as an electric generator, combined with a variable internal compression ratio supercharger for supplying varying amounts of air to the diesel engine to match the rate of air flow delivered to the diesel engine with the rate of air flow drawn by the diesel engine such that no air pressure rise occurs in the air intake manifold of the diesel engine when additional power output of the diesel engine is not required. The supercharger is a positive air displacement mechanism powered by the diesel engine. The supercharger has intake air flow controls that regulate the volume of air discharged by the supercharger to the diesel engine to maintain the speed of the diesel engine substantially constant when driving large variable loads than a smaller engine could without the supercharger. Air is moved through the supercharger with a pair of rotating screw rotors or one female and one male screw having cooperating helical grooves and protrusions or lands that create positive air flow to the diesel engine. The volume of air flow discharged by the supercharger is regulated by controlling the effective air pumping length of the screw rotors. A plurality of gates associated with the rotors control the air pumping operation of the rotors. Actuators, such as solenoids, connected to the gates function to move the gates between out and in positions relative to the rotors. When all of the gates are in the "in" positions a maximum volume of air is pumped by the supercharger into the diesel engine to facilitate cold starting of the diesel engine. The volume of air supplied to the diesel engine by the supercharger is changed by selectively moving the gates between their out and in positions. A controller responsive to the speed and load on the engine actuates the solenoids to control the volume of air supplied to the diesel engine to maintain the diesel speed and load requirements of the diesel engine. The variable compression ratio supercharger produces the lowest parasitic losses to the system by minimizing the pumping work required of the supercharger to meet the current load requirement.

An object of the invention is to improve the power to weight ratio of diesel engines to replace gasoline engines for mobile electric power generators. Another object of the invention is to combine a supercharger and four stroke diesel engine to improve the engine's portability and reduce its size and weight. A further object of the invention is to combine a four stroke diesel engine and a positive displacement air supercharger having the ability to efficiently adjust boost air pressure to the engine over the engine operating range to increase the fuel efficiency of the engine. Yet another object of the invention is to provide a variable positive displacement air supercharger for a four stroke diesel engine that can boost air pressure at cold cranking speeds to enhance the starting of the diesel engine, allowing the engine to benefit from a lower compression ratio once started for after-start running efficiency.

DESCRIPTION OF DRAWING

FIG. 2 is a side elevational view of the supercharger;

DESCRIPTION OF THE INVENTION

Figure 1:
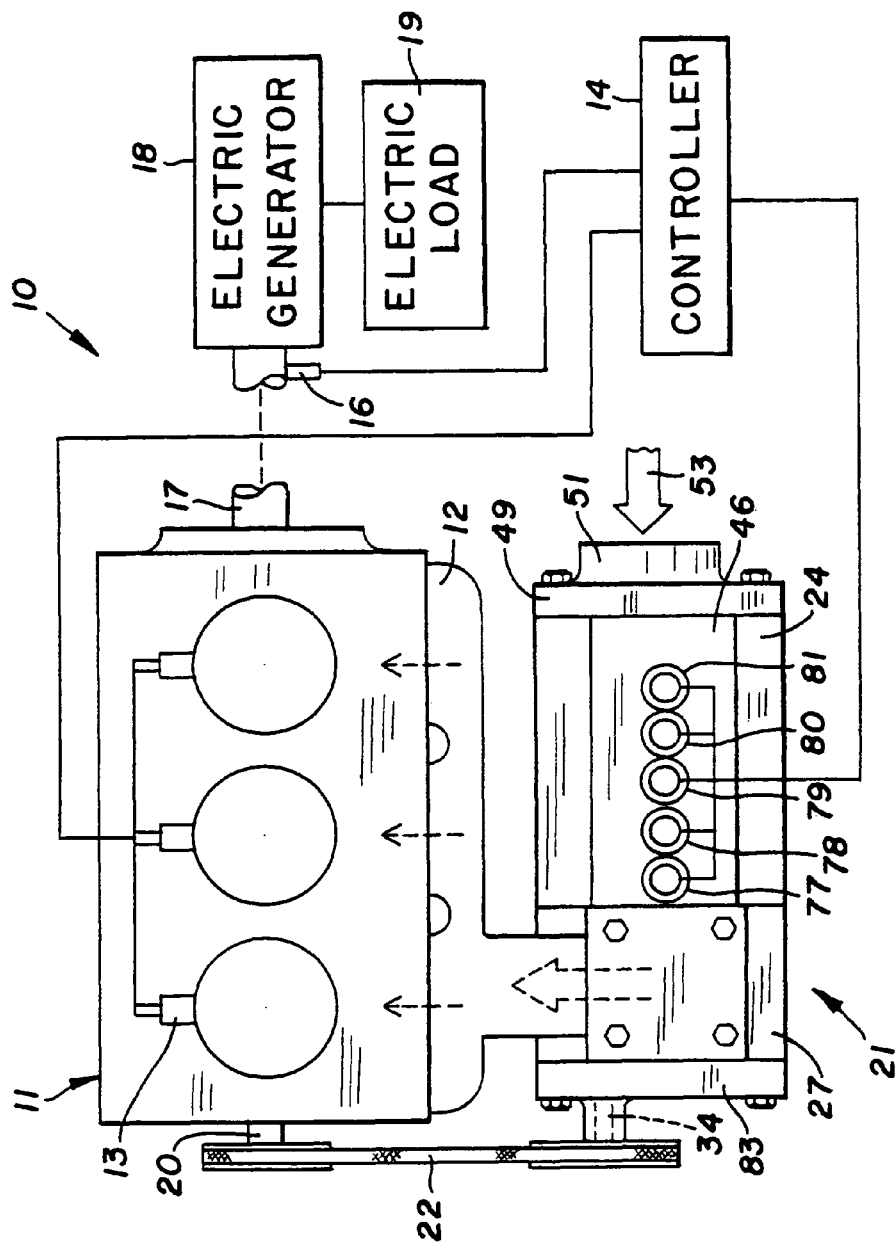
FIG. 1 is a diagram of a four cylinder diesel engine and supercharger of the invention connected to an electric generator.

The supercharged diesel engine system 10 of the invention, shown in FIG. 1, has a conventional four stroke internal combustion piston engine 11 that uses the heat of highly compressed air to ignite a spray of fuel, such as hydrocarbon fuel oil introduced into the combustion chambers. This type of internal combustion engine is known as a four stroke diesel engine. Engine 11 includes an air intake manifold 12 for accommodating an air supply for the combustion chambers of the engine. Fuel injectors 13 have solenoids wired to a controller 14 operable to timely supply hydrocarbon fuel, known as diesel fuel, to the combustion chambers of engine 11. Controller 14 is wired to a sensor 16 that senses the timing and rotational speed of the output or drive shaft 17 of engine 11. The signals from sensor 16 are processed by the electronic components of controller 14 whereby controller 14 generates electric output energy that timely actuates injectors 13 to discharge fuel into the combustion chambers of the engine when the pistons are near the top of their strokes.

Figure 1A:
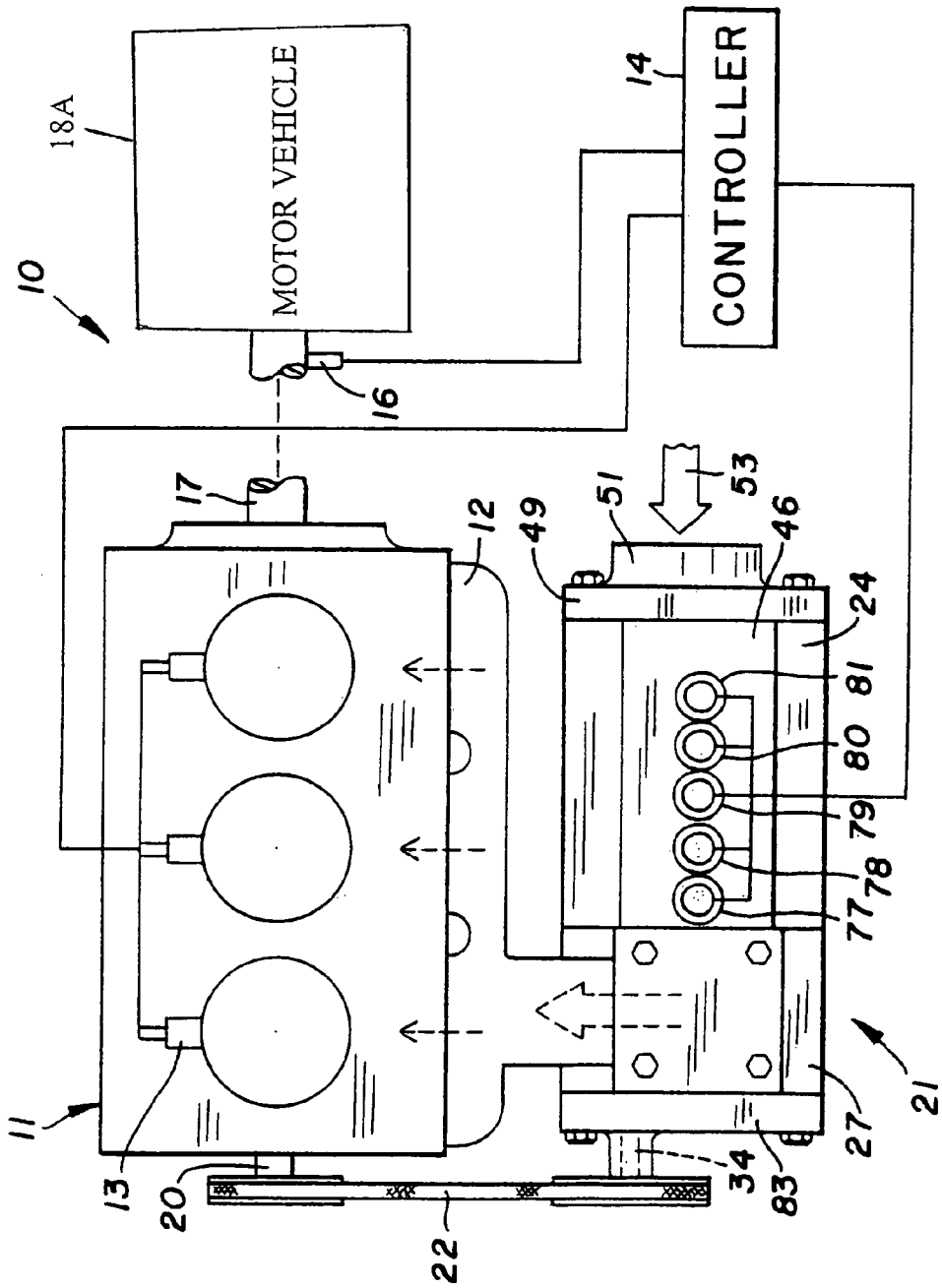
FIG. 1A is a diagram of the engine and supercharger of FIG. 1 for a motor vehicle.

Drive shaft 17 is connected to an electric generator 18 which supplies electric power to an electrical load 19. Load 19 is one or more electric power systems including electric motors, lights, data processing equipment, and heating and air conditioning units. The electric power systems have varying electric energy requirements which change the load on electric generator 18. Increased load on generator 18 requires engine 11 to increase its power output. Fuel injectors 13 add additional fuel to the combustion chambers of engine 11 to increase the power output of engine 11. Excess fuel exhausts as smoke and unburned hydrocarbons. The speed of engine 11 may slow down as the load on generator 18 increases. The reduction of the speed of generator 18 can be undesirable as it may alter the electric frequency and voltage output of the generator 18. Generator 18 is typically designed to operate at a constant speed to produce a constant and reliable electric frequency power output. Diesel engine 11 can be used to operate machines, motor vehicles, ships and other apparatus that require operating power. FIG. 1A illustrates the engine 11 and supercharger 21 of FIG. 1 combined with a motor vehicle 18A. For example, diesel engines having capacities of 100 to 5,000 hp are used on industrial and municipal electric generators and on continuously operated pipeline oil pumps.

Air is supplied to intake manifold 12 of the engine with a supercharger indicated generally at 21. Supercharger 21 is drivably connected to engine front drive shaft 20 with a power transmission 22, such as a belt and pulley drive. Power transmission 22 can be a gear drive. The operating speed of supercharger 21 is directly proportional to the rotational speed of drive shaft 20 of engine 11.

Figure 3:
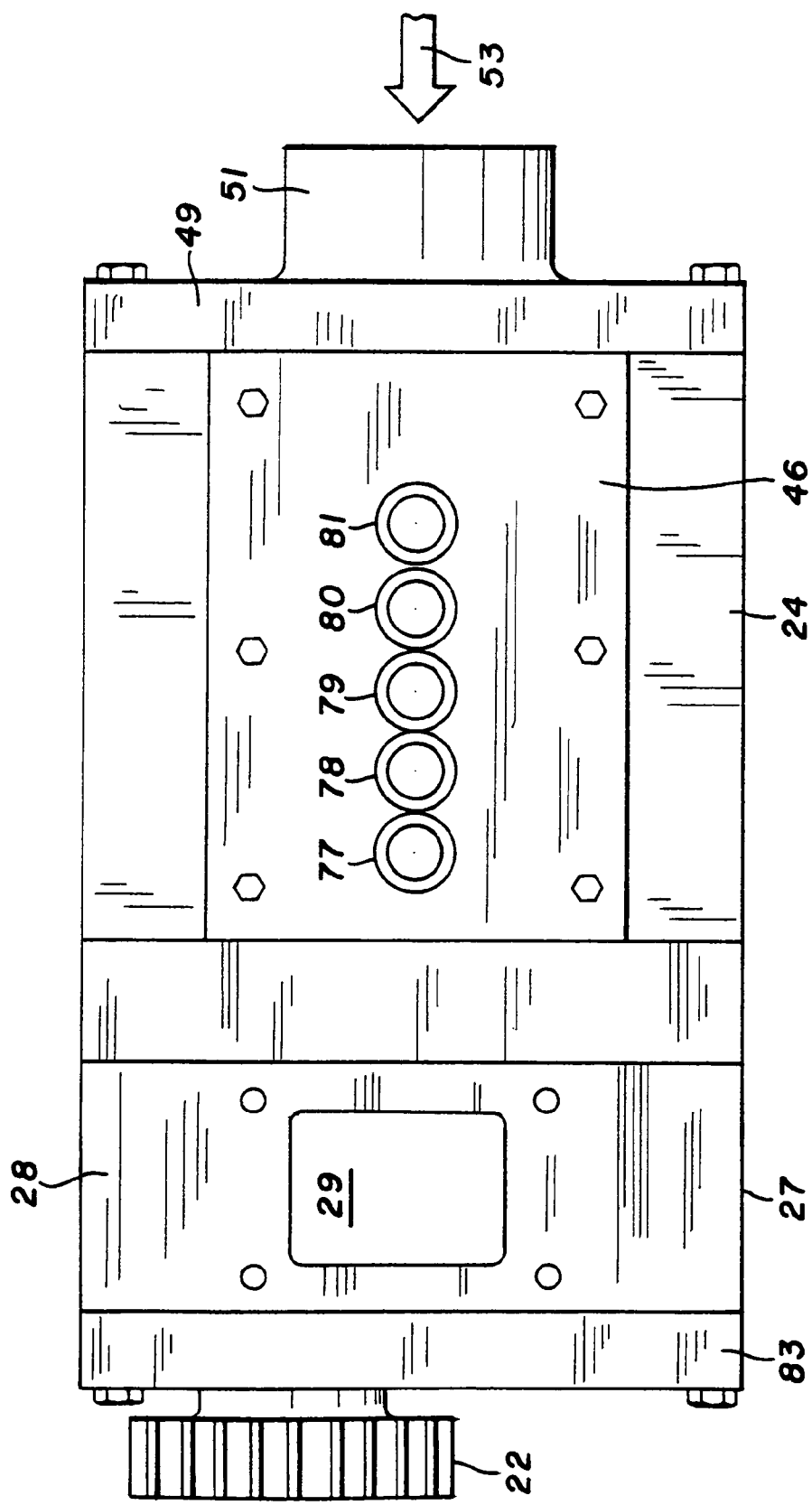
FIG. 3 is a top plan view of the supercharger.
Figure 5:
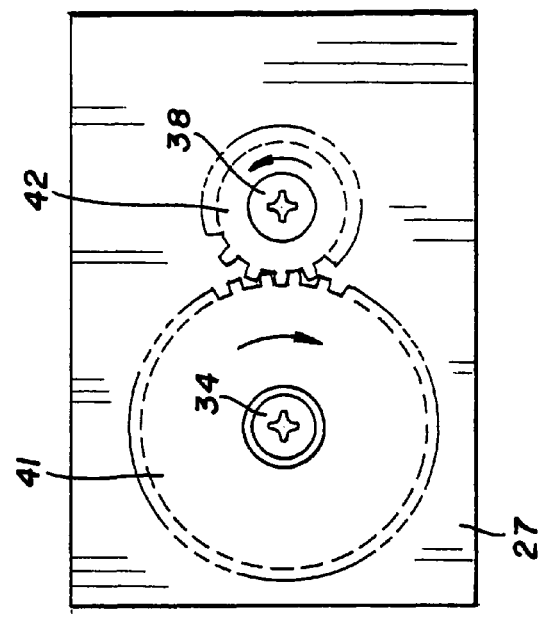
FIG. 5 is a sectional view taken along the line 5-5 of FIG. 2.
Figure 6:
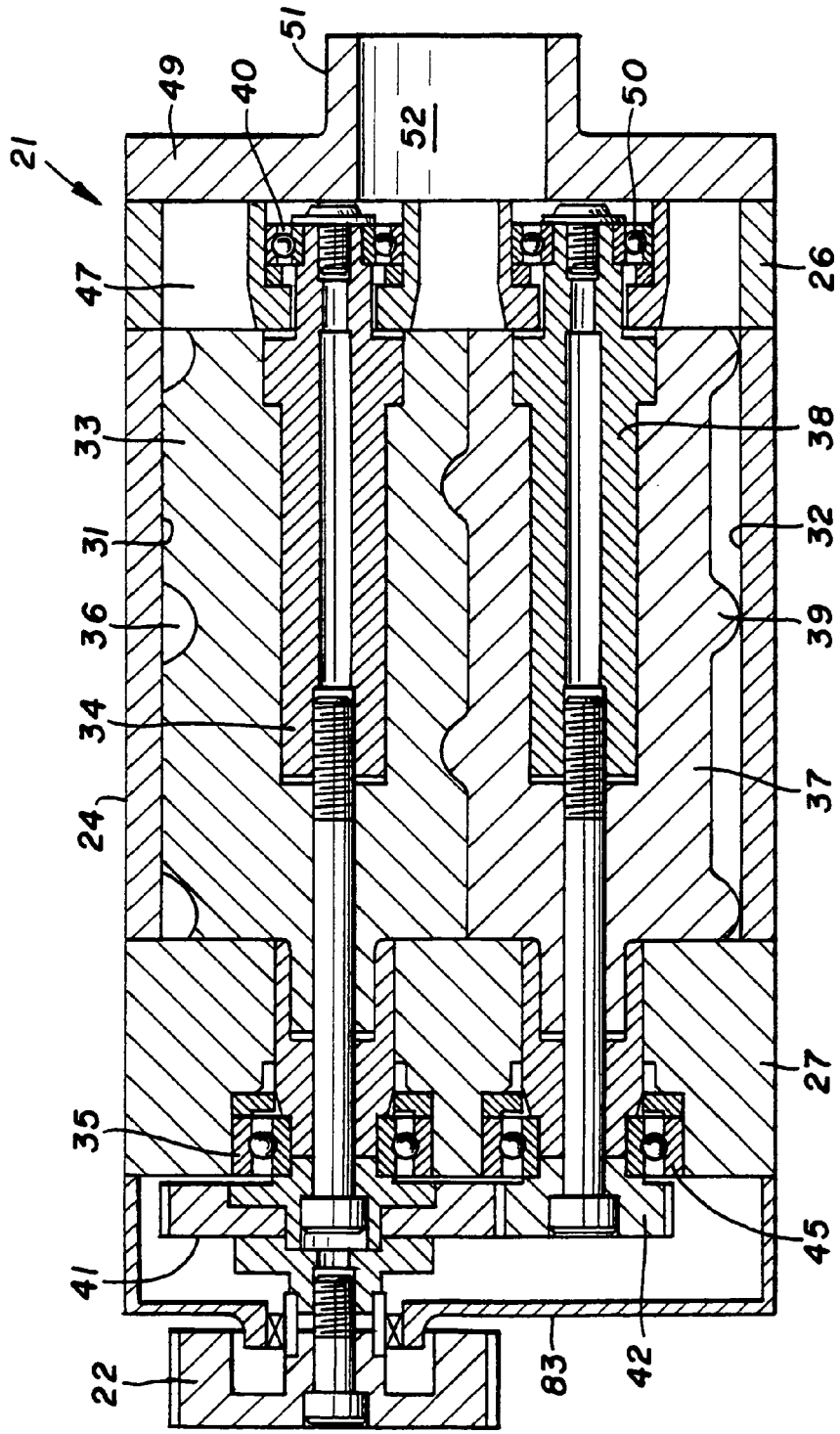
FIG. 6 is a sectional view taken along the line 6-6 of FIG. 2.
Figure 7:
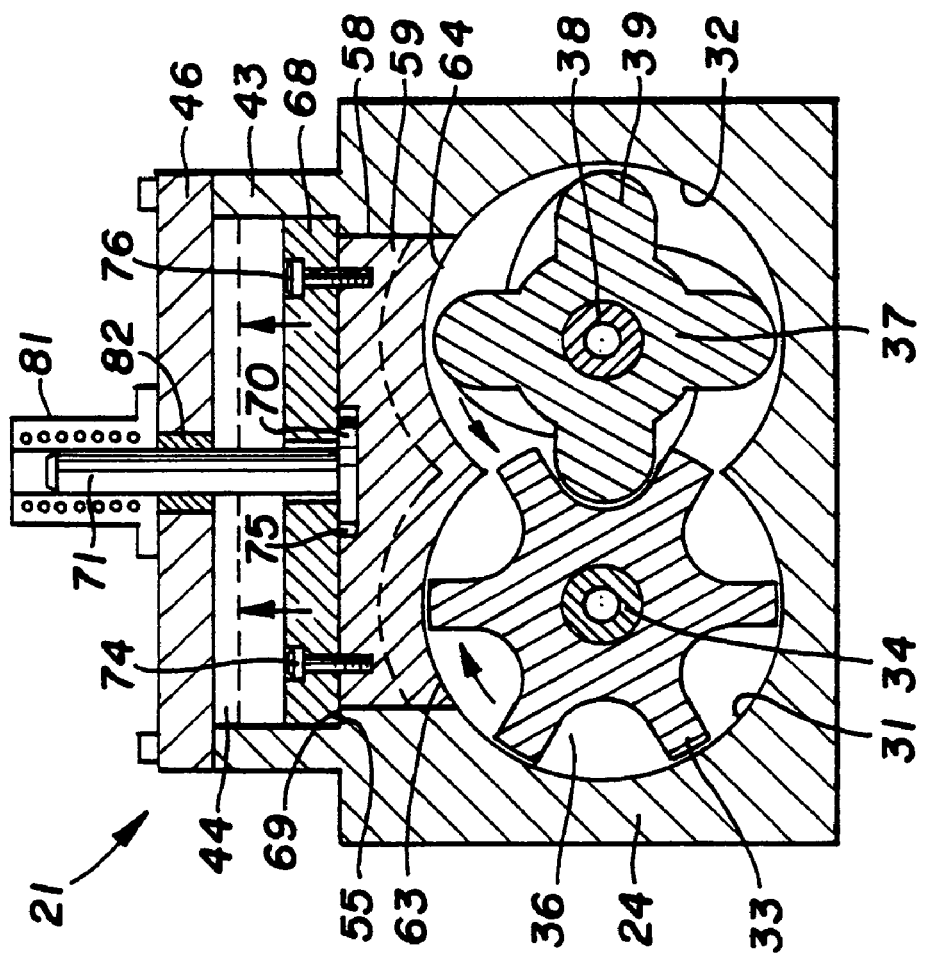
FIG. 7 is a sectional view taken along the line 7-7 of FIG. 2.

Supercharger 21, shown in FIGS. 2, 4, 5 and 6, has a generally rectangular housing 24 and end walls 26 and 27 attached to opposite ends of housing 24. The top wall 28 of end wall 27 has an air discharge port 29 in communication with air intake manifold 12 of engine 11. As shown in FIG. 3, port 29 has a generally rectangular shape with a bottom wall that extends upwardly and rearwardly. As shown in FIGS. 6 and 7, the interior of housing 24 has side-by-side cylindrical chambers 31 and 32. A first female rotor 33 mounted on shaft 34 is located in chamber 31. Rotor 33 has a plurality of helical semi-cylindrical grooves 36 having helical extents of about 270 degrees in the outer wall of the rotor. Rotor 33 has six circumferentially spaced helical grooves. The number and helical extent of the grooves can vary. A second male rotor 37 mounted on shaft 38 is located in chamber 32. Rotor 37 located generally parallel to rotor 33 has a number of helical semi-cylindrical protrusions or lands 39 projected in radial outward directions from the outer wall of rotor 37. The size, shape and helical twists of lands 39 are complimentary to the size, shape and helical twists of helical grooves 36 in rotor 33. Rotor 37 has four helical lands 39 which cooperate with six helical grooves 36 in rotor 33. Lands 39 have helical extents of about 270 degrees along the length of rotor 37. Other land and groove shapes, numbers, sizes and helical extents can be incorporated into cooperating screw rotors 33 and 37. Shaft 34 is rotatably mounted on bearings 35 and 40 retained in end walls 26 and 27. Shaft 38 is rotatably mounted on bearings 45 and 50 retained in end walls 26 and 27. Bearings 40 and 50 have a slip fit on end wall 26 to allow for thermo expansion of rotors 33 and 34.

As shown in FIGS. 5 and 6, shafts 34 and 38 are drivably connected with gears 41 and 42 which concurrently rotate rotors 33 and 37 in opposite circular directions. Other types of power transmission devices, such as an endless belt and pulley drives, can be used to drivably connect shafts 34 and 38. An end cover 83 enclosing gears 41 and 42 is attached to end plate 27.

Returning to FIG. 1, motor 11 rotates shaft 34 thereby turning rotors 33 and 37 and moving air through supercharger 21 into manifold 12. The volume of the air discharged by supercharger 21 into manifold 12 is changed or altered to meet the load 19 of electric generator 18. Supercharger 21 operates to substantially match the rate of air flow delivered to manifold 12 with the rate of air now drawn by the diesel engine.

Figure 4:
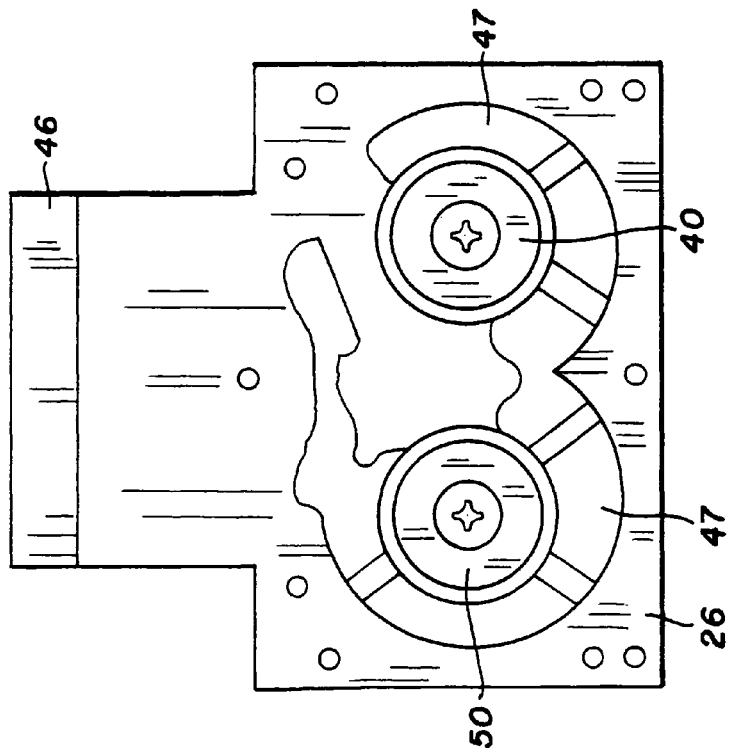
FIG. 4 is a sectional view taken along the line 4-4 of FIG. 2.

As shown in FIGS. 2 and 7, housing 24 has an upright U-shaped wall 43 and inside shoulders 55 surrounding a chamber 44. A plate 46 connected to wall 43 covers the top of chamber 44. End plate 26 closes the front of chamber 44. As shown in FIG. 4, end plate 26 has a plurality of air intake openings 47 open to the air inlet ends of chambers 31 and 32 accommodating rotors 33 and 37. Air intake openings 47 surround the portions of end plate 26 that rotatably support shafts 34 and 38. An air inlet cover 49, shown in FIGS. 2, 3 and 6, is attached to the outer side of end plate 46. Cover 49 has a central tubular extension 51 having a passage 52 to allow air, shown by arrow 53, to flow into supercharger 21. Air filters and air pre-cleaners can be associated with extension 51 to filter and clean air flowing to the inlets ends of chambers 31 and 32.

Figure 9:
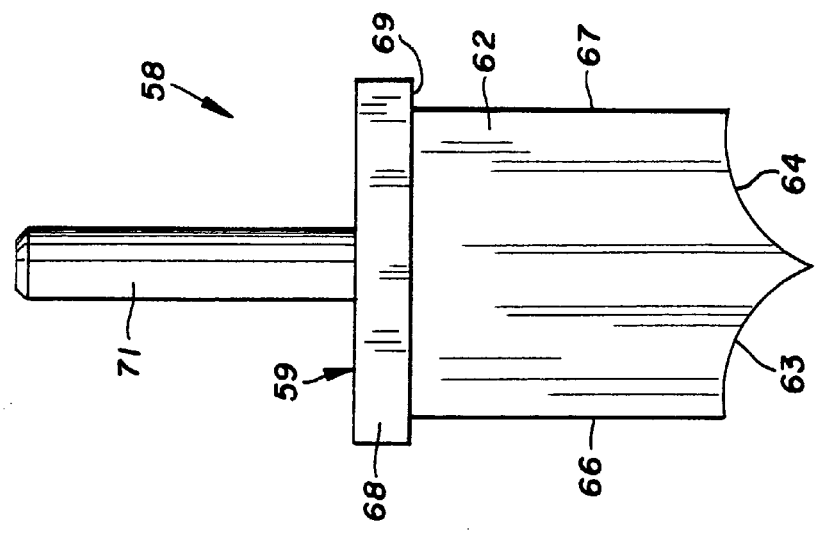
FIG. 9 is a front plan view of the gate of FIG. 8.
Figure 8:
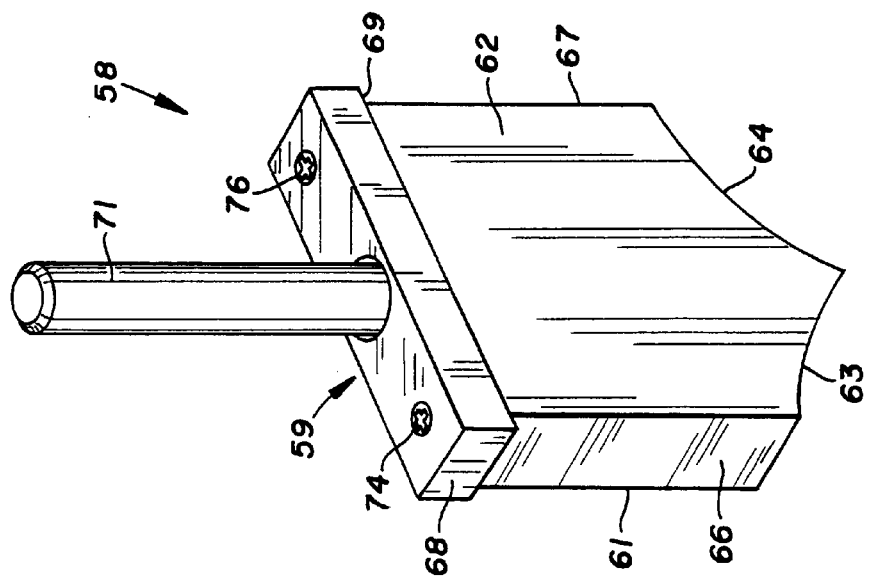
FIG. 8 is a perspective view of a gate of the supercharger shown in FIG. 2.

The flow of air in chambers 31 and 32 along the length of rotors 33 and 37 is regulated with a plurality of movable side-by-side gates 54, 55, 56, 57 and 58, shown in FIGS. 7 and 10 to 15, located in chamber 44. The number and sizes of the gates can vary according to the air moving capacity of the supercharger. Gate 58, shown in FIGS. 8 and 9, is a flat plate 59 having flat opposite surfaces 61 and 62 and concave lower surfaces 63 and 64 concentric with the outer surfaces of rotors 33 and 37. Opposite ends 66 and 67 of plate 59 are flat surfaces extended upwardly to a top plate 68 having outwardly directed stops 69. Fasteners shown as bolts 74 and 76 secure plates 68 to plate 59. A cylindrical rod or core 71 extends upwardly from the center of the top of plate 68. A pair or holes 72 and 73 in plate 68 accommodate bolts 74 and 76 which secure plate 68 to plate 59. As shown in FIG. 7, rod 71 extends through a hole in plate 68. The lower end of rod 71 has a head 70 located in a recess 75 in the top of plate 59. Gates 54 to 58 have the same structure as gate 58. Stops 69, shown in FIG. 7, on opposite sides of gates 54 to 58 engage shoulders 55 when the gates are in the in or closed positions. Stops 69 prevent the lower surfaces of gates 54 to 58 from contacting rotors 33 and 37. Gates 54 to 58 are selectively moved to out and in positions relative to rotors 33 and 37 with solenoid actuators 77, 78, 79, 80 and 81 wired to controller 14, as shown in FIG. 1. Solenoid actuator 81 mounted on plate 46 includes a rod or core 71 extended through a sleeve bearing 82 mounted on plate 46. The head 70 on the lower end of core 71 is connected to gate 58 with plate 68. When solenoid actuator 81 is energized gate 58 is pulled up to an out position, shown in broken lines in FIGS. 7 and 15, reducing the volume of air moved by rotors 33 and 34 to manifold 12. Gates 54 to 57 are moved to out and in positions with solenoid actuators 77 to 80 to vary the volume of air moved by rotors 33 and 37 into manifold 12 according to the air flow volume drawn by the diesel engine. Controller 14 responsive to the load on engine 11 selectively and jointly actuates the solenoids 77 to 80. Mechanical cams, lift rollers in push-pull tracks, lever systems and fluid operated cylinders can be used to selectively and concurrently move gates 54 to 58 to out and in positions.

Figure 10:
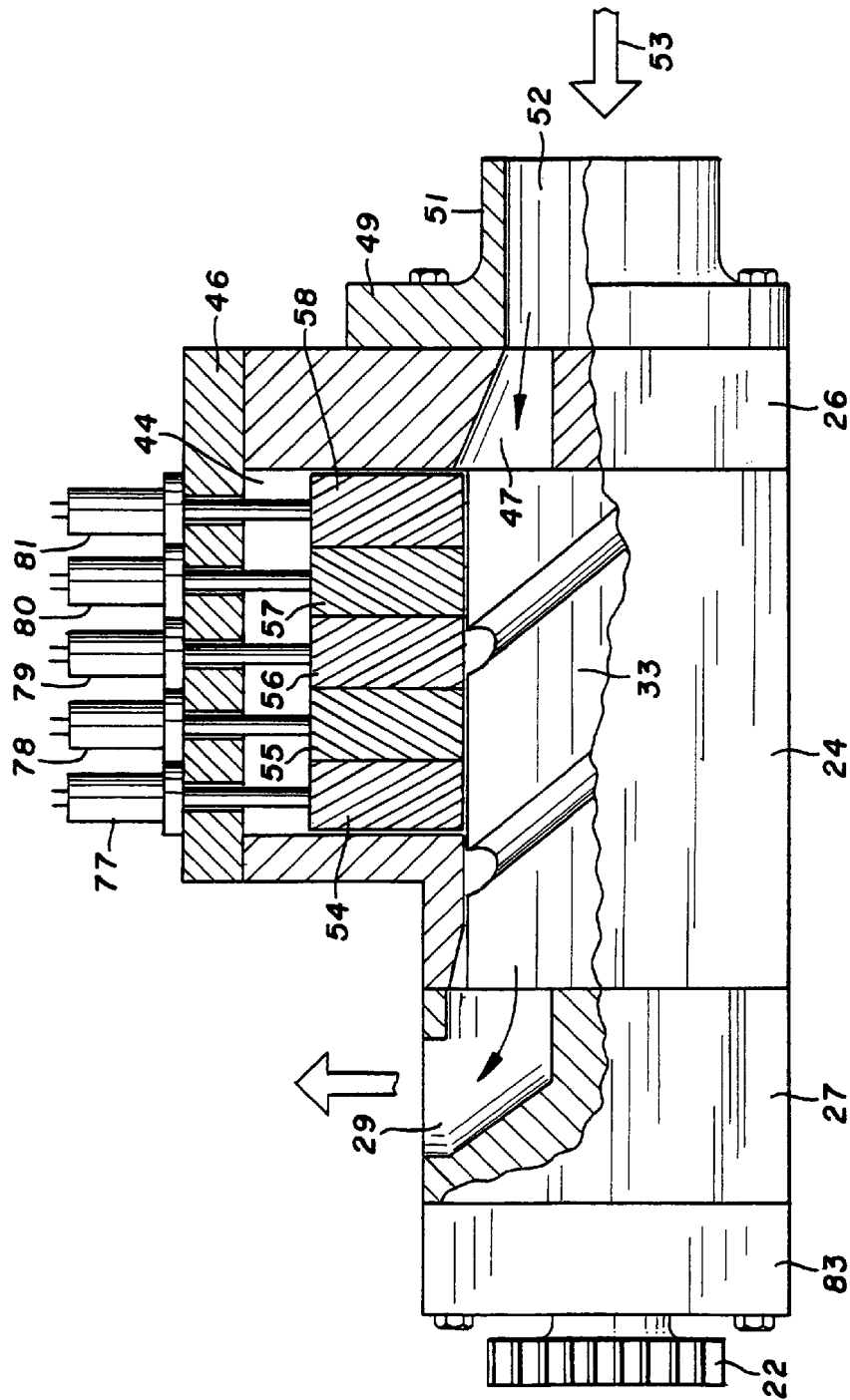
FIG. 10 is a side elevational view of the supercharger partly sectioned showing all the air flow control gates in the in or closed diesel engine start position.

As shown in FIG. 10, gates 54 to 58 are located in down or in positions. The lower surfaces of each gate 54 to 58 are positioned adjacent the outer surface of the lands of rotor 37 and the outer surface or rotor 33. When gates 54 to 58 are all closed, rotors 33 and 37 move a maximum volume of air per revolution to manifold 12 of diesel engine 11. Gates 54 to 58 are in down positions adjacent rotors 33 and 37 during the cold starting of diesel engine 11.

Figure 11:
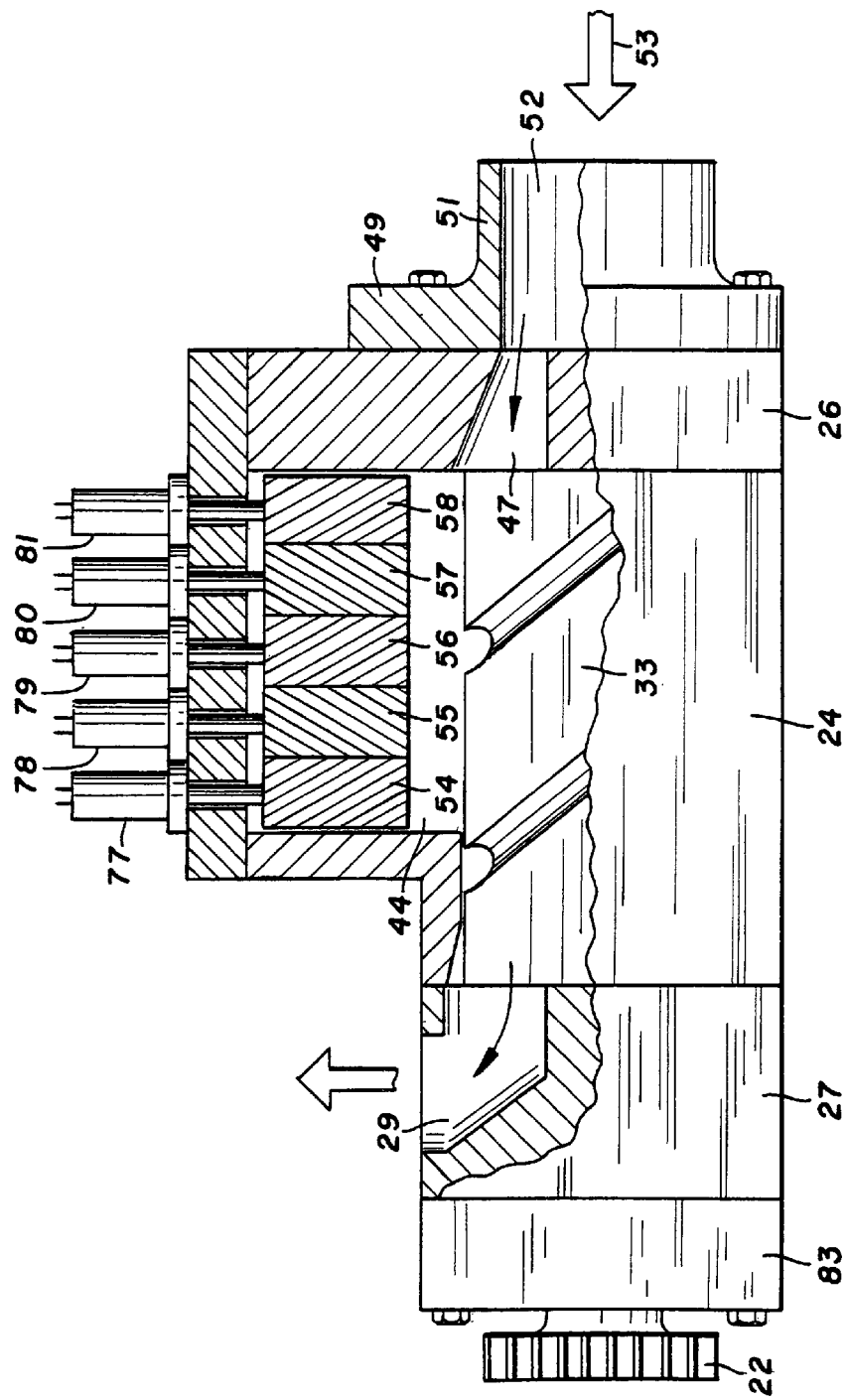
FIG. 11 is a side elevational partly sectioned view according to FIG. 10 showing all of the air flow control gates in the open or out diesel engine naturally aspirated unboosted position.

As shown in FIG. 11, all of gates 54 to 58 are located in lip or out positions. The lower surfaces of gates 54 to 58 are spaced above rotors 33 and 37 and allow air to flow along chamber 44 whereby only a small amount of air per revolution is moved by rotors 33 and 37 to air discharge port 29 in communication with manifold 12 of engine 11. Gates 54 to 58 are out when additional boost is not required to meet the power load on engine 11. The displacement volume of supercharger 21 when gates 54 to 58 are all out is related to the engine displacement so that when gates 54 to 58 are out the intake manifold pressure remains essentially at atmospheric pressure. This assures that as gates 54 to 57 are moved in the internal air pressure in supercharger 21 closely matches the intake manifold air pressure. This results in the most efficient operation of engine 11 with no boost or varying levels of boost. The term boost is the air pressure in the intake manifold 12 above atmospheric pressure.

Figure 12:
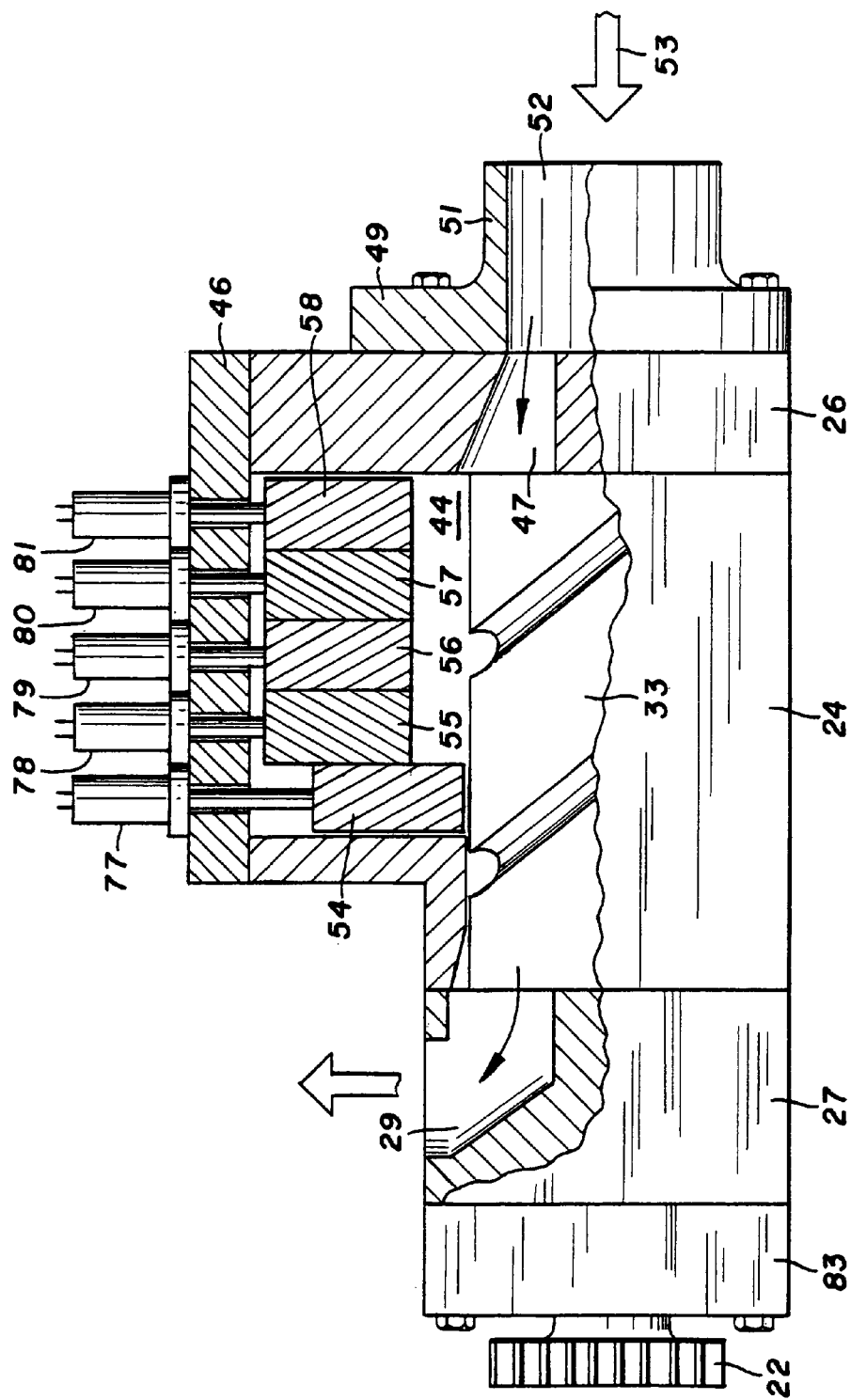
FIG. 12 is a side elevational view partly sectioned according to FIG. 10 showing the first air flow control gate in the in diesel engine light boost position.

As shown in FIG. 12, gate 54 is in "in" position and gates 55 to 58 are in "out" positions. When gates 55 to 58 are in "out" positions, air flows in chamber 44, circulates back to intake ends of the rotors and flows to "in" position gate 54 before rotors 33 and 37 begin to move air to air discharge port 29. The amount of air moved by rotors 33 and 37 is increased thereby increasing intake manifold air pressure above atmospheric pressure allowing engine 11 to meet the load efficiently in this power band.

Figure 13:
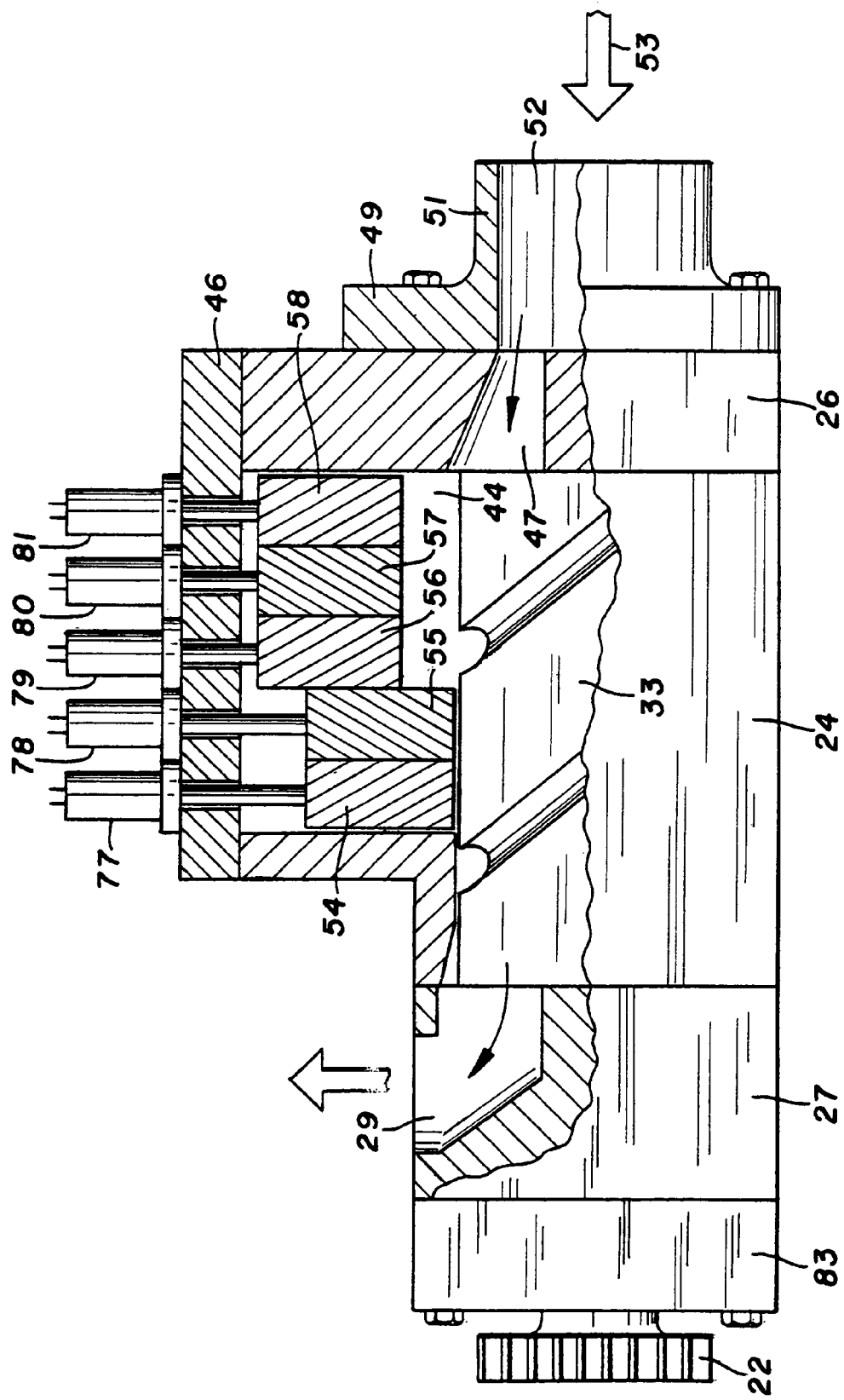
FIG. 13 is a side elevational view partly sectioned according to FIG. 10 showing the first and second air flow control gates in the diesel engine intermediate or half boost position.

As shown in FIG. 13, gates 54 and 55 are in "in" positions and gates 56 and 58 are in "out" positions. When gates 56 to 58 are in "out" positions, air flows in chamber 44 to "in" position gate 55 before rotors 33 and 37 begin to move air to air discharge port 29. The amount of air moved by rotors 33 and 37 when gates 54 and 55 are closed allows engine 11 to efficiently run between this load range.

Figure 14:
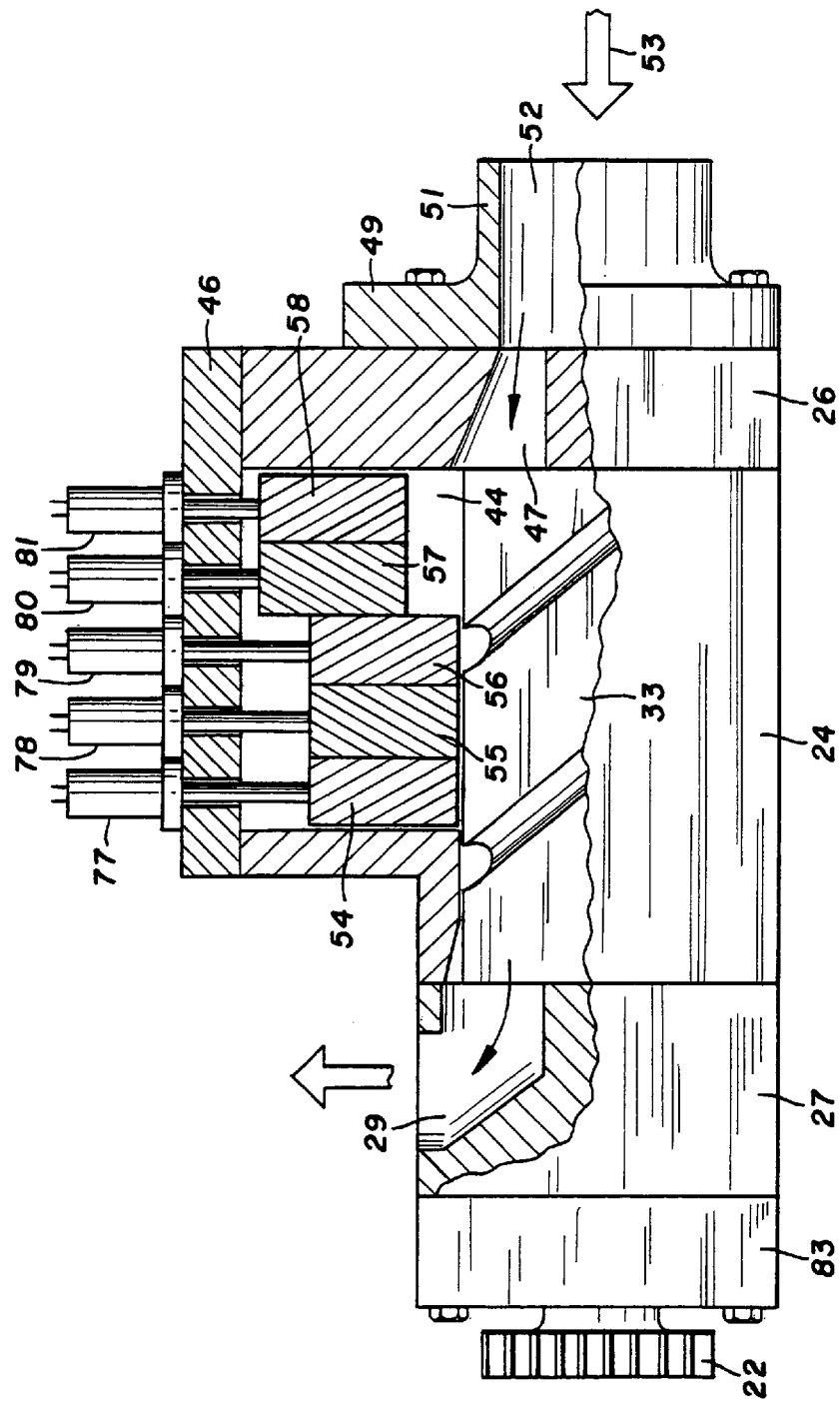
FIG. 14 is a side elevational view partly sectioned according to FIG. 10 showing the first, second and third air now control gates in the diesel engine an increased boost position.

As shown in FIG. 14, engine 11 runs at the next level of boost when gates 54 to 56 are in "in" positions. Gates 57 and 58 remain open to allow engine 11 to efficiently run in this range of the next level of boost.

Figure 15:
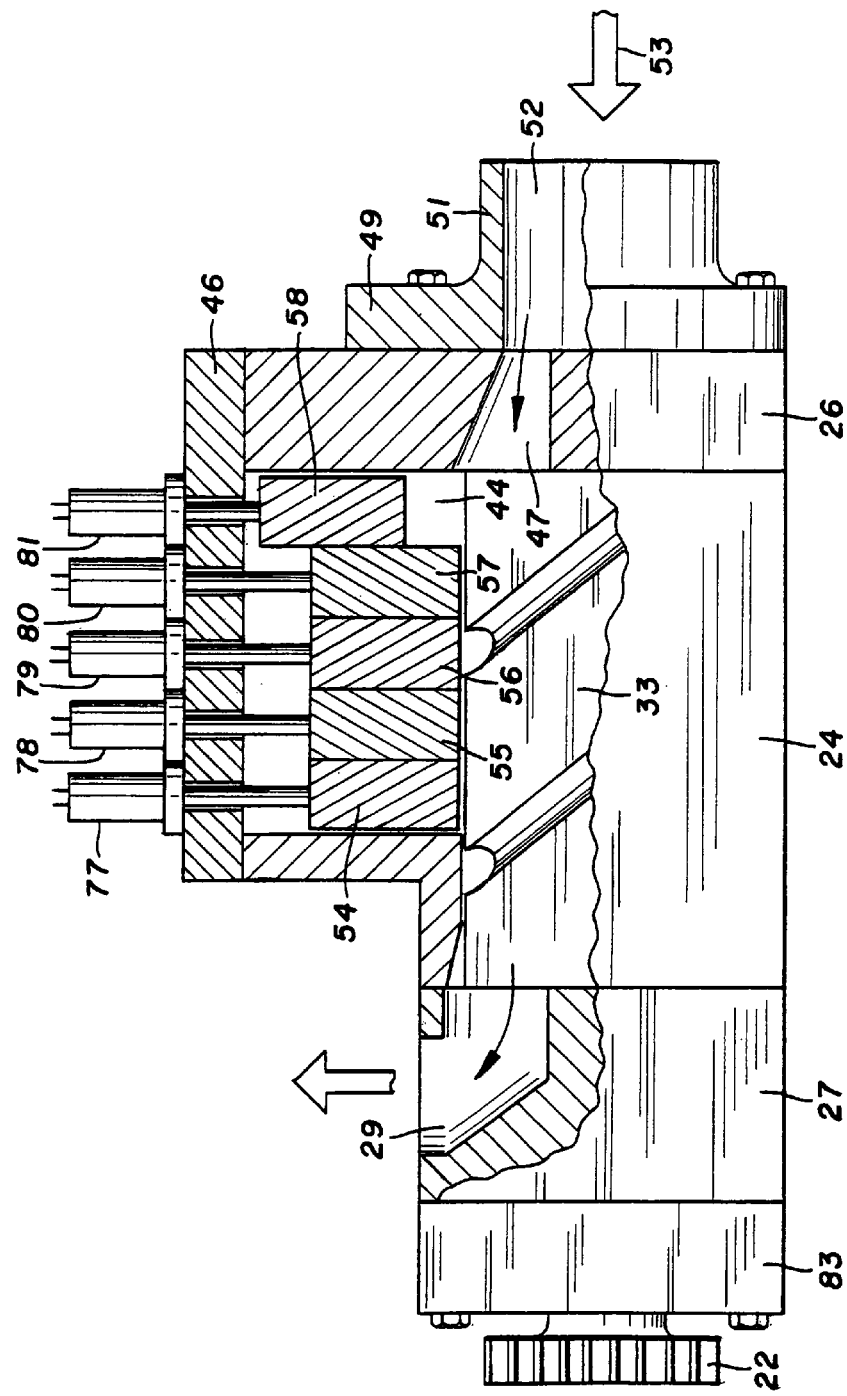
FIG. 15 is a side elevational view partly sectioned according to FIG. 10 showing the first, second, third and fourth air flow control gates in the diesel engine full boost positions.

As shown in FIG. 15, engine 11 runs at full boost when gates 54 to 57 are in "in" positions and gate 58 is in an "out" position. Gate 58 is only in the "in" position during the starting of engine 11.

The invention has been shown and described with reference to the preferred embodiment. Any number of gates can be used to control air flow of the supercharger. The number and size of the gates can vary with the air moving capacity of the supercharger. Modifications and alterations of the positive displacement air supercharger and air flow controls can be made by persons skilled in the art without departing from the invention.

The invention claimed is:

1. A method for supplying power with a diesel engine to an apparatus comprising:
    operating a diesel engine having at least one combustion chamber for accommodating air and combustible fuel,
    drivably connecting the diesel engine to the apparatus whereby the diesel engine powers the apparatus and the apparatus imparts a power demand on the diesel engine,
    generating a signal of the power demanded of the diesel engine,
    delivering the signal of the power demanded of the diesel engine to a controller operable to provide output command signals of the power demanded of the diesel engine,
    supplying air to the combustion chamber of the diesel engine with a supercharger comprising a positive air displacement device having at least one movable member operable to vary the effective displacement of the positive air displacement device such that it varies the trapped air volume generally at the point that the internal air compression of the supercharger begins,
    operating the supercharger to generate the air supplied to the combustion chamber of the diesel engine,
    varying the air supplied by the supercharger to the combustion chamber of the diesel engine by operation of the movable member responsive to the command signals from the controller of the power demanded of the diesel engine to selectively boost the flow of air delivered to the combustion chamber of the diesel engine at or above the naturally aspirated flow of air to the combustion chamber of the diesel engine, and
    introducing combustion fuel into the combustion chamber of the diesel engine responsive to the command signals from the controller corresponding to the boost of the flow of air delivered to the combustion chamber of the diesel engine.

2. The method of claim 1 including:
    providing a motor vehicle apparatus having the diesel engine.

3. The method of claim 1 including:
    drivably connecting the supercharger to the diesel engine to operate the supercharger to generate a supply of air to the combustion chamber of the diesel engine.

4. A method for supplying power with an internal combustion engine to an apparatus comprising:
    operating an internal combustion engine having at least one piston chamber for accommodating air and combustible fuel,
    drivably connecting the internal combustion engine to the apparatus whereby the internal combustion engine powers the apparatus and the apparatus imparts a power demand on the internal combustion engine,
    generating a signal of the power demanded of the internal combustion engine,
    delivering the signal of the power demanded of the internal combustion engine to a controller operable to provide output command signals of the power demanded of the internal combustion engine,
    supplying air to the piston chamber of the internal combustion engine with a supercharger comprising a positive air displacement device having at least one movable member operable to vary the displacement of the positive air displacement device such that it varies the trapped air volume generally at the point that the internal air compression of the supercharger begins,
    operating the supercharger to generate the supply of air to the piston chamber of the internal combustion engine,
    varying the air supplied by the supercharger to the piston chamber of the internal combustion engine by operation of the movable member responsive to the command signals from the controller of the power demanded of the internal combustion engine to selectively boost the flow of air delivered to the piston chamber of the internal combustion engine at or above the naturally aspirated flow of air to the piston chamber of the internal combustion engine, and
    introducing combustible fuel to the internal combustion engine responsive to the command signals from the controller corresponding to the boost of the flow of air delivered to the piston chamber of the internal combustion engine to maintain a desired air to fuel ratio in the piston chamber of the internal combustion engine.

5. The method claim 4 including:
    providing a motor vehicle apparatus having the internal combustion engine.

6. The method of claim 4 including:
    drivably connecting the supercharger to the internal combustion engine to operate the supercharger to generate a supply of air to the piston chamber of the internal combustion engine.

7. A method for supplying power with an internal combustion engine to an apparatus comprising:
    operating an internal combustion engine having a plurality of piston chambers for accommodating air and combustible fuel,
    drivably connecting the internal combustion engine to the apparatus whereby the internal combustion engine powers the apparatus and the apparatus imparts a power demand on the internal combustion engine,
    generating a signal of the power demanded of the internal combustion engine,
    delivering the signal of the power demanded of the internal combustion engine to a controller operable to provide output command signals of the power demanded of the internal combustion engine,
    supplying air to the piston chambers of the internal combustion engine with a supercharger comprising a positive air displacement device having at least one movable member to vary the displacement of the positive air displacement device such that it varies the trapped air volume generally at the point that the internal air compression of the supercharger begins,
    operating the supercharger to generate the supply of air to the piston chambers of the internal combustion engine,
    varying the air supplied by the supercharger to the piston chambers of the internal combustion engine by operation of the movable member responsive to the command signals from the controller of the power demanded of the internal combustion engine to selectively boost the flow of air delivered to the piston chambers of the internal combustion engine at or above the naturally aspirated flow of air to the piston chambers of the internal combustion engine, and introducing combustible fuel to the internal combustion engine responsive to the command signals from the controller corresponding to the boost of the flow of air delivered to the piston chambers of the internal combustion engine to maintain a desired air to fuel ratio in the piston chambers of the internal combustion engine.

8. The method claim 7 including:

providing a motor vehicle apparatus having the internal combustion engine.

9. The method of claim 7 including:

drivably connecting the supercharger to the internal combustion engine to operate the supercharger to generate a supply of air to the piston chambers of the internal combustion engine.

10. A method for supplying electric power to an electric load with an internal combustion engine comprising:

operating an internal combustion chamber having an air intake passage and at least one piston chamber for accommodating air and combustible fuel, supplying electric power to an electric load with an electric generator, drivably connecting the internal combustion engine to the electric generator whereby the internal combustion engine operates the electric generator to supply electric power to an electric load and the electric generator imparts a load on the internal combustion engine, sensing the load on the internal combustion engine and providing a sensed signal representing the sensed load on the internal combustion engine, delivering the sensed signal of the load on the internal combustion engine to a controller operable to provide output command signals of the load on the internal combustion engine, supplying air to the air intake passage of the internal combustion engine with a supercharger comprising a positive air displacement device having at least one movable member operable to vary the effective air displacement of the positive air displacement device such that it varies the trapped air volume generally at the point that the internal air compression of the supercharger begins, driving the supercharger with the internal combustion engine to generate the air supplied to the air intake passage of the internal combustion engine, varying the air supplied by the supercharger to the air intake passage of the internal combustion engine by operation of the movable member responsive to the command signals from the controller of the load on the internal combustion engine to selectively boost the flow of air delivered to the air intake passage of the internal combustion engine at or above the naturally aspirated flow of air to the air intake passage of the internal combustion engine, and introducing combustible fuel into the piston chamber of the internal combustion engine responsive to the command signals from the controller corresponding to the boost of the flow of air delivered to the air intake passage of the internal combustion engine to maintain a desired air to fuel ratio in the piston chamber of the internal combustion engine.

\* \* \* \* \*